(12) United States Patent
Liljedahl

(10) Patent No.: US 10,939,611 B2
(45) Date of Patent: Mar. 9, 2021

(54) ADAPTIVE SIGNAL TRANSMISSION

(71) Applicant: Husqvarna AB, Huskvarna (SE)

(72) Inventor: Marcus Liljedahl, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 16/607,502

(22) PCT Filed: Apr. 11, 2018

(86) PCT No.: PCT/SE2018/050371
§ 371 (c)(1),
(2) Date: Oct. 23, 2019

(87) PCT Pub. No.: WO2018/199830
PCT Pub. Date: Nov. 1, 2018

(65) Prior Publication Data
US 2020/0093057 A1    Mar. 26, 2020

(30) Foreign Application Priority Data
Apr. 25, 2017 (SE) .................................. 1750496-0

(51) Int. Cl.
*A01D 34/00* (2006.01)
*G05D 1/02* (2020.01)
(Continued)

(52) U.S. Cl.
CPC ......... *A01D 34/008* (2013.01); *G05D 1/0265* (2013.01); *H04L 12/10* (2013.01);
(Continued)

(58) Field of Classification Search
CPC ............. A01D 34/008; A01D 2101/00; G05D 1/0265; G05D 2201/0208; G05D 1/0276; H04L 12/10; H04L 69/28; H04L 67/12
(Continued)

(56) References Cited

U.S. PATENT DOCUMENTS 3,933,099 A * 1/1976 Sieb ...................... G05D 1/0265
104/88.04
4,284,160 A * 8/1981 DeLiban .................. B62D 1/28
104/299

(Continued)

FOREIGN PATENT DOCUMENTS

EP      2375301 A2   10/2011
WO   03104908 A1   12/2003
(Continued)

OTHER PUBLICATIONS

Swedish Search Report for Application No. 1750496-0 dated Jan. 15, 2018.
(Continued)

*Primary Examiner* — Edwin C Holloway, III
(74) *Attorney, Agent, or Firm* — Burr & Forman, LLP

(57) ABSTRACT

A robotic lawnmower system, comprising a charging station comprising a controller said controller being configured to associate a time slot for use to transmit a guide signal, and a robotic lawnmower, wherein said controller is configured to detect if a guide cable is connected to the charging station or not, and if not, allot said associated time slot to another use.

12 Claims, 7 Drawing Sheets

(51) Int. Cl.
  *H04L 29/06* (2006.01)
  *H04L 12/10* (2006.01)
  *A01D 101/00* (2006.01)
  *H04L 29/08* (2006.01)

(52) U.S. Cl.
  CPC .......... *H04L 69/28* (2013.01); *A01D 2101/00* (2013.01); *G05D 2201/0208* (2013.01); *H04L 67/12* (2013.01)

(58) Field of Classification Search
  USPC ...... 340/4.2; 180/167, 168, 169; 701/22, 23, 701/50
  See application file for complete search history.

(56) References Cited

U.S. PATENT DOCUMENTS

| | | | |
|---|---|---|---|
| 2008/0109126 A1* | 5/2008 | Sandin | B60L 50/62 701/23 |
| 2011/0234153 A1* | 9/2011 | Abramson | G05D 1/0265 320/107 |
| 2013/0317680 A1* | 11/2013 | Yamamura | A01D 34/008 701/22 |
| 2014/0379196 A1 | 12/2014 | Da Rocha et al. | |
| 2017/0322562 A1* | 11/2017 | Churavy | G05D 1/0265 |

FOREIGN PATENT DOCUMENTS

| | | |
|---|---|---|
| WO | 2014/158060 A1 | 10/2014 |
| WO | 2015/115949 A1 | 8/2015 |
| WO | 2016/000734 A1 | 1/2016 |

OTHER PUBLICATIONS

International Search Report and Written Opinion for International Application No. PCT/SE2018/050371 dated May 30, 2018.
International Preliminary Report on Patentablity for International Application No. PCT/SE2018/050371 dated Oct. 29, 2019.

* cited by examiner

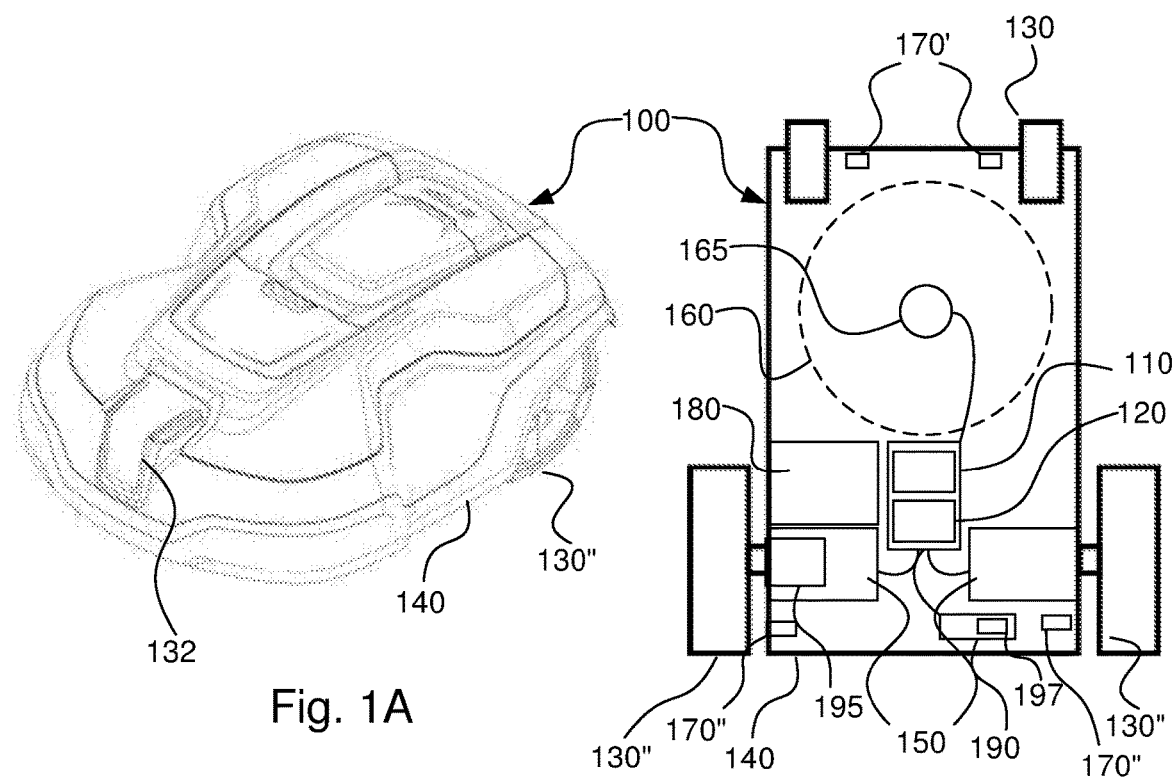
Fig. 1A
Fig. 1B
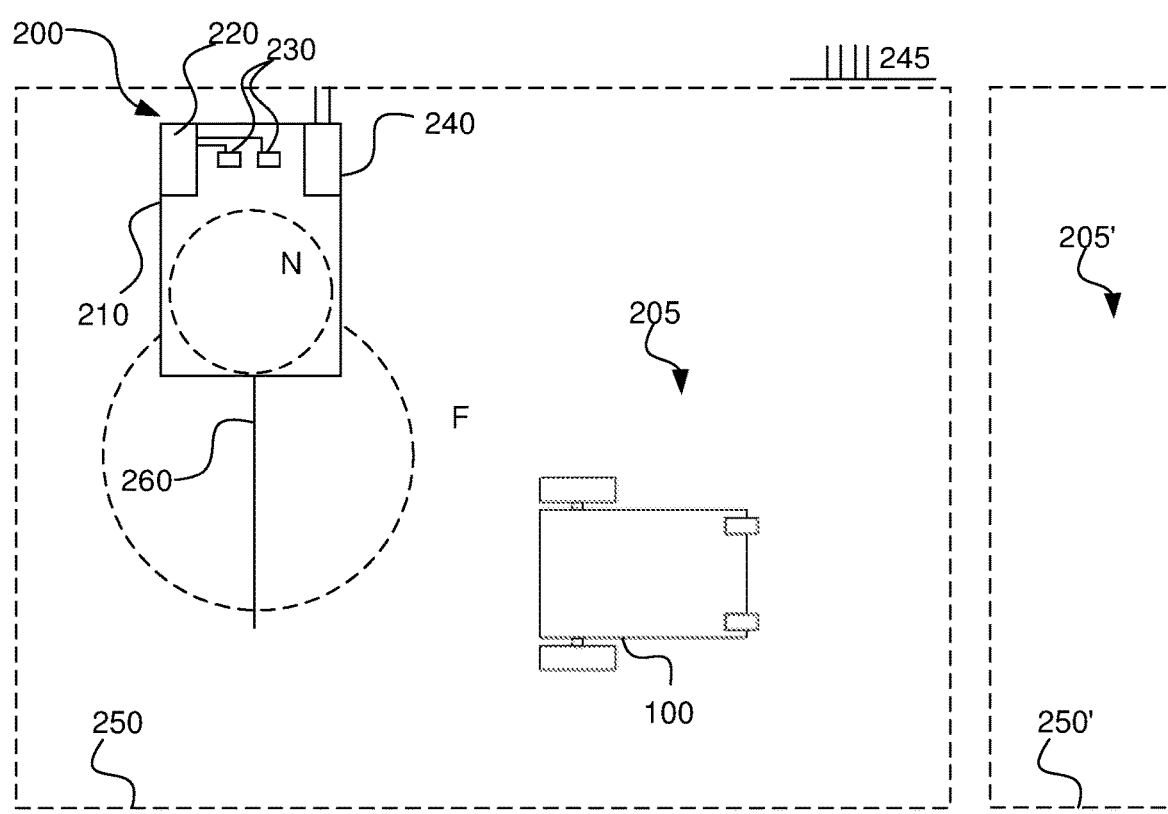
Fig. 2

ADAPTIVE SIGNAL TRANSMISSION

TECHNICAL FIELD This application relates to automatic lawnmowers and in particular to a method for performing improved reception and transmission of a signal.

BACKGROUND

Automated or robotic power tools such as robotic lawnmowers are becoming increasingly more popular. In a typical deployment, a work area, such as a garden, is enclosed by a boundary cable with the purpose of keeping the robotic lawnmower inside the work area. The robotic lawnmower is typically also configured to communicate with a charging station located in the work area and connected to the boundary cable.

SUMMARY

It has been realized by the inventors that to simplify the installation process for a robotic lawnmower system, the user or installer may be given an option to install guide wires or not. Using guide wires has the benefit that the robotic lawnmower may be able to find its way back to the charging station more effectively than randomly searching for the charging station or F-field. Due to constrictions on allowed field strengths, the total field strength of the guide signal, including the F-field, must be kept below certain levels. This is a legal requirement to prevent a system from causing too much interference to its surroundings.

However, the inventors have realized the simple solution that by allotting the time slots for the guide cable(s) G to the F-field F, the field strength of the F-field may be increased without increasing the field strength for the whole guide signal, thereby allowing for a stronger F-field while staying within the legal requirements.

It is also an object of the teachings of this application to overcome the problems listed above by providing a robotic lawnmower system, comprising a charging station comprising a controller said controller being configured to associate a time slot for use to transmit a guide signal, and a robotic lawnmower, wherein said controller is configured to detect if a guide cable is connected to the charging station or not, and if not, allot said associated time slot to another use.

It is also an object of the teachings of this application to overcome the problems listed above by providing a method for controlling a robotic lawnmower system, comprising a charging station, the method comprising associating a time slot for use to transmit a guide signal, and a robotic lawnmower, and detecting if a guide cable is connected to the charging station or not, and if not, allotting said associated time slot to another use.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which:

FIG. 1A shows an example of a robotic lawnmower according to one embodiment of the teachings herein;

FIG. 1B shows a schematic view of the components of an example of a robotic lawnmower according to one embodiment of the teachings herein;

FIG. 2 shows an example of a robotic lawnmower system according to the teachings herein;

DETAILED DESCRIPTION

Figure 3:
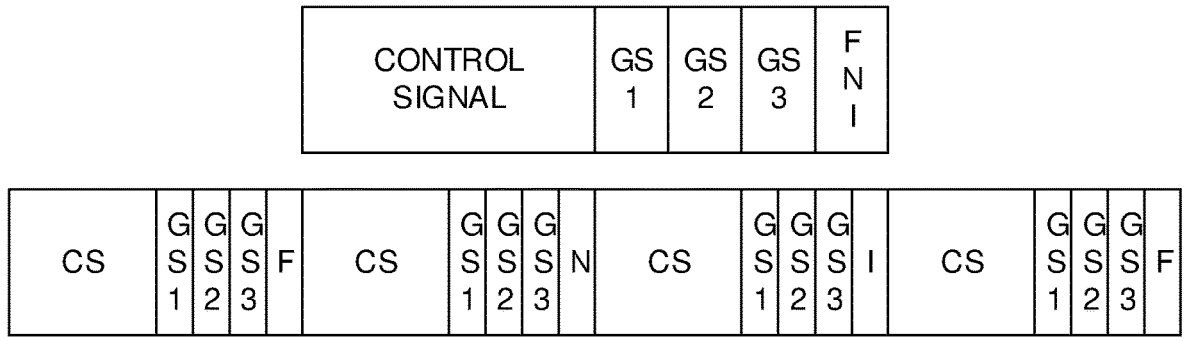
FIG. 3 shows a schematic view of a protocol according to one embodiment of the teachings herein.

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

It should be noted that all indications of rotational speeds, time durations, work loads, battery levels, operational levels etc. are given as examples and may be varied in many different ways as would be apparent to a skilled person. The variations may be for individual entities as well as for groups of entities and may be absolute or relative.

FIG. 1A shows a perspective view of a robotic working tool 100, here exemplified by a robotic lawnmower 100, having a body 140 and a plurality of wheels 130 (only one shown). As can be seen, the robotic lawnmower 100 may comprise charging skids 132 for contacting contact plates (not shown in FIG. 1, but referenced 230 in FIG. 2) when docking into a charging station (not shown in FIG. 1, but referenced 210 in FIG. 2) for receiving a charging current through, and possibly also for transferring information by means of electrical communication between the charging station and the robotic lawnmower 100.

FIG. 1B shows a schematic overview of the robotic working tool 100, also exemplified here by a robotic lawnmower 100, having a body 140 and a plurality of wheels 130.

It should be noted that even though the description given herein will be focused on robotic lawnmowers, the teachings herein may also be applied to robotic cleaners such as robotic vacuum cleaners and/or robotic floor cleaners, robotic ball collectors, robotic mine sweepers, robotic farming equipment, or other robotic work tools to be employed in a work area defined by a boundary cable.

In the exemplary embodiment of FIG. 1B the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1B, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further have at least one sensor 170; in the example of FIG. 1 there are four sensors divided into a first sensor pair 170' arranged at a front of the robotic lawnmower 100 and a second sensor pair 170", respectively arranged at the rear of the robotic lawnmower 100 to detect a magnetic field (not shown) and for detecting a boundary cable and/or for receiving (and possibly also sending) information from a signal generator (will be discussed with reference to FIG. 2). The sensors 170 may thus be arranged as front sensors 170' and rear sensors 170".

In some embodiments, the sensors 170 may be connected to the controller 110, and the controller 110 may be configured to process and evaluate any signals received from the sensor pairs 170, 170'. The sensor signals may be caused by the magnetic field being generated by a control signal being transmitted through a boundary cable. This enables the controller 110 to determine whether the robotic lawnmower 100 is close to or crossing a boundary cable, or inside or outside an area enclosed by the boundary cable. This also enables the robotic lawnmower 100 to receive (and possibly send) information from the control signal.

The robotic lawnmower 100 also comprises a grass cutting device 160, such as a rotating blade 160 driven by a cutter motor 165. The grass cutting device being an example of a work tool 160 for a robotic work tool 100. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

The robotic lawnmower 100 may further comprise at least one supplemental navigation sensor 190, such as a deduced reckoning navigation sensor for providing signals for deduced reckoning navigation, also referred to as dead reckoning. Examples of such deduced reckoning navigation sensor(s) 190 are odometers and compasses. The supplemental navigation sensor may also or alternatively be implemented as a vision navigation system, or Ultra Wide Band radio navigation system to mention a few examples. The supplemental sensor 195 will hereafter be exemplified through the deduced reckoning sensor.

The robotic lawnmower 100 may further be arranged with a wireless communication interface 197 for communicating with other devices, such as a server, a personal computer or smartphone, or the charging station. Examples of such wireless communication devices are Bluetooth™, Global System Mobile (GSM) and LTE (Long Term Evolution), to name a few.

In addition, the robotic lawnmower 100 may be arranged with collision sensor means for detecting when the robotic lawnmower 100 runs into an obstacle. The collision sensor means may be one or more separate sensors (such as accelerometers, pressure sensors or proximity sensors) arranged in or on the housing of the robotic lawnmower 100 and capable of detecting an impact caused by a collision between the robotic lawnmower 100 and an obstacle. Alternatively, the collision sensor means may be implemented as a program routine run by the controller 110, being effective to detect a sudden decrease of the rotational speed of any of the drive wheels 130" and/or sudden increase in the drive current to the electric motor 150.

FIG. 2 shows a schematic view of a robotic working tool system 200 in one embodiment. The schematic view is not to scale. The robotic working tool system 200 comprises a charging station 210 and a boundary cable 250 arranged to enclose a work area 205, in which the robotic lawnmower 100 is supposed to serve. Adjacent to the work area 205 is another work area 205' enclosed by a boundary 250'. Although not shown, in some embodiments, the other work area 205' may also comprise a charging station and robotic working tool deployed within.

As with FIG. 1, the robotic working tool is exemplified by a robotic lawnmower, but the teachings herein may also be applied to other robotic working tools adapted to operate within a work area defined by a boundary cable. The work area is defined by a signal being transmitted through the boundary cable, which gives rise to a magnetic field that the sensor s 170 of the robotic lawnmower detects and based on this, the robotic lawnmower may determine whether it is inside or outside the work area and also when it crosses the boundary cable.

The charging station may have a base plate for enabling the robotic lawnmower to enter the charging station in a clean environment and for providing stability to the charging station 210.

The charging station 210 has a charger 220, in this embodiment coupled to two charging plates 230. The charging plates 230 are arranged to co-operate with corresponding charging plates (not shown) of the robotic lawnmower 100 for charging a battery 180 of the robotic lawnmower 100.

The charging station 210 also has, or may be coupled to, a signal generator 240 for providing a control signal 245 to be transmitted through the boundary cable 250. The signal generator thus comprises a controller for generating the control signal. The control signal 245 comprises an alternating current, such as a continuously or regularly repeated current signal. The control signal is in one embodiment a CDMA signal (CDMA—Code Division Multiple Access). As is known in the art, the current signal will generate a magnetic field around the boundary cable 250 which the sensors 170 of the robotic lawnmower 100 will detect. As the robotic lawnmower 100 (or more accurately, the sensor 170) crosses the boundary cable 250 the direction of the magnetic field will change. The robotic lawnmower 100 will thus be able to determine that the boundary cable has been crossed, and take appropriate action by controlling the driving of the rear wheels 130" to cause the robotic lawnmower 100 to turn a certain angular amount and return into the work area 205. For its operation within the work area 205, in the embodiment of FIG. 2, the robotic lawnmower 100 may use the satellite navigation device 190, supported by the deduced reckoning navigation sensor 195 to navigate the work area 205.

The use of more than one sensor 170 enables the controller 110 of the robotic lawnmower 100 to determine how the robotic lawnmower 100 is aligned with relation to the boundary cable 250 by comparing the sensor signals received from each sensor 170. This enables the robotic lawnmower to follow the boundary cable 250, for example when returning to the charging station 210 for charging. Optionally, the charging station 210 may have a guide cable 260 for enabling the robotic lawnmower to find the entrance of the charging station 210. In some embodiments the guide cable 260 is formed by a loop of the boundary cable 250. In some embodiments the guide wire 260 is used to generate a magnetic field for enabling the robotic lawnmower 100 to find the charging station without following a guide cable 260.

The guide cable is connected to the charging station through one of at least one connector. The connector that a guide cable is connected to, determines which guide signal the guide cable will be associated with.

Additionally, the robotic lawnmower 100 may use the satellite navigation device 190 to remain within and map the work area 205 by comparing the successive determined positions of the robotic lawnmower 100 against a set of geographical coordinates defining the boundary 250, obstacles, keep-out areas etc of the work area 205. This set of boundary defining positions may be stored in the memory 120, and/or included in a digital (virtual) map of the work area 205. The boundary 250 of the work area 205 may also be marked by a boundary cable supplementing the GNSS navigation to ensure that the robotic work tool stays within the work area, even when no satellite signals are received.

The charging station 210 may also be arranged (through the signal generator 220) to emit a so-called F-field, referenced F in FIG. 2. The F-field is a magnetic field generated around the charging station which enables a robotic lawnmower to navigate towards the charging station 210 without having to follow a guide or boundary cable, simply by navigating towards an increased field strength of the F-field.

The charging station 210 may also be arranged (through the signal generator 220) to emit a so-called N-field, referenced N in FIG. 2. The N-field is a magnetic field generated in the base plate 215 of the charging station which enables a robotic lawnmower to navigate correctly in the charging station for making contact with the charging plates 230.

The control signal 245 may also be used to provide information I to the robotic lawnmower 100 from the charging station 210 through the boundary cable 250 and/or the guide wire 260. The information may be transmitted as a coded message and may relate to an identity for the robotic lawnmower system 200, such as an identity of the robotic lawnmower and/or an identity for the charging station 210 (or rather the signal generator), a command to be executed by the robotic lawnmower 100 and/or data that the robotic lawnmower may base an operating decision upon, such as weather data.

In one embodiment, the information I carried in the control signal 245 is coded using a CDMA (Code Division Multiple Access) coding scheme. In fact, the whole signal A is coded using CDMA, so the information I, and the portions relating to F, G and N signals are also coded using CDMA: As CDMA allows for more than one transmitter to transmit information simultaneously using the same frequency, and as the magnetic waves generated by a current signal in a cable all propagate through the same medium this allows for having more than one work area 205, 205' being serviced by each a robotic lawnmower 100 and its corresponding signal generator 240 adjacent one another, while still being able to transmit a coded message that is directed at a specific robotic lawnmower 100.

In some embodiments the robotic lawnmower 100 may also be arranged to send a signal to the charging station 210 to provide status updates, request data and/or for establishing a two-way communication. The robotic lawnmower may be arranged with a signal generator (not shown) and an antenna for transmitting electromagnetic signals (not shown). The electromagnetic signals may be transmitted directly to the charging station 210 or be picked up by the boundary cable 250, the boundary cable then double acting as an antenna. In the following, focus will be on communication from the charging station 210 (via the signal generator 240) to the robotic lawnmower 100.

The robotic lawnmower listens or detects the signal by receiving the voltages generated by the sensor as it detects the magnetic fields generated by the signal. The received signal is then auto correlated with a reference signal. The autocorrelation may be shifted in time, i.e. synchronized, to provide as good a correlation as possible. This will enable the robotic lawnmower to compensate for any differences or drifts in the clock of the signal generator and the clock of the robotic lawnmower. In one embodiment the CDMA signal 245 is coded using Gold codes. In the field of robotic lawnmowers a normal frame length for Gold codes is in the order of 2047 bits, however to speed up the system, the robotic lawnmower system according to the teachings herein may be adapted to use a different frame length. The protocol used in one embodiment consists of two Gold frame lengths of each 2047 bits totalling 2×2047 bits, which frame is divided into smaller frames, for example 7 frames of each 584 bits, or 10 frames of each 409 bits. It should be noted that other number of frames may also be used.

Every other frame (1, 3, 5, 7 . . . , n) is used to send the control signal. Every other frame (2, 4, 6, 8, . . . , n+1) is used to send the F-field, the N-field and the guide signal(s), each being transmitted in a further sub frame. In one embodiment, time division is used for transmitting the F-field, the N-filed and any information I that may be needed to be transmitted to (from) the robotic lawnmower 100. One example of such a protocol is shown in FIG. 3 where the upper figure shows the general format, and the lower figure shows an example. In FIG. 3 guide signal is abbreviated GS and there are three guide cables, each transmitting a guide signal; GS1, GS2, and GS3, and control signal is abbreviated CS. It should be noted that the time scales for the upper figure and the lower figure are not the same, the upper showing two frames and the lower showing 8 frames.

It should be noted that the control signal CS is transmitted through the boundary cable 250, the guide signals are transmitted through their respective guide cables, the F field is transmitted through its respective cable and the N field is transmitted through its respective cable. The information bits I may be transmitted through any, some and/or all cables depending on the information and the design chosen.

It should also be noted that the number of sub frames my of course differ from system to system, depending on the systems capabilities. For example, in a robotic working tool system not having an F field, the F-field signal will not be transmitted, and in a robotic working tool system not having three guide cables, the number of sub frames used for the guide signals would also differ.

Using standardised coding such as Gold codes, has the obvious advantage that new coding schemes need not be invented. However, the inventors have realized that the frame length commonly used for CDMA coding, such as Gold coding, when used with technology commonly used for lawnmower systems leads to a transmission time for the entire frame that is in the order of seconds, such as 1 second, 0.5 seconds or up to 0.5 seconds. Such time spans may be unpractical in real life implementations as a robotic lawnmower operating using such time frames would move a distance that could not be neglected before being able to decode the entire frame. The robotic lawnmower may thus be rendered unable to detect whether it is still within the work area or not.

This would for practical reasons render gold coding inoperable for robotic lawnmower systems. To overcome this, the inventors realized that by dividing a frame as per above, shorter segments of the entire frame, i.e. sub frames, may be used to control the robotic lawnmower. By configuring the signal generator to transmit sub frames and by configuring the robotic lawnmower to operate according to sub frames, the gold coding of CDMA systems, may be used along with contemporary hardware technologies, commonly used in robotic lawnmower systems, such as transmitting a signal through a boundary cable, which signals is picked up by coil-based sensors in the robotic lawnmower.

By dividing the frame into several subframes, for example 10 or as in the detailed example given above, the robotic lawnmower is enabled to tune in and listen for shorter time spans since the control information is retransmitted more often, or at higher frequencies, and the robotic lawnmower does not need to receive and decode an entire frame before being able to make a control decisions, such as determining the crossing of a cable or if the robotic lawnmower is inside or outside a working area.

However, as a longer frame provides for a more robust system, that is less sensitive to interference, the inventors have realized that they may make use of the duality offered by utilizing subframes, namely that the robotic lawnmower is configured to decode and operate according to subframes under a first set of conditions, and to decode and operate according to complete frames under a second set of conditions, and even to decode and operate according to subframes and whole frames under a third set of conditions.

The first set of conditions includes that the received quality signal level is high, whereby interference is assumingly low and shorter time frames may be sufficient and provide enough robustness.

The first set of conditions may alternatively or additionally include that the received signal power is high, whereby the robotic lawnmower is assumingly close to the boundary cable and also possibly that the interference is not strong enough to affect the reception, and whereby the shorter time frames may be needed to provide a fast enough control of the robotic lawnmower.

The second set of conditions includes that the received quality signal level is low, whereby interference is assumingly high and full frames are needed to provide sufficient robustness.

The second set of conditions may alternatively or additionally include that the received signal power is low, whereby the robotic lawnmower is assumingly far away from the boundary cable and also possibly that the interference is strong enough to affect the reception, and whereby the full frames may be needed to provide a robust enough control of the robotic lawnmower.

The third set of conditions may include that the signal quality level is low, but the signal strength level is high, indicating that the robotic lawnmower is close to the boundary cable but in a noisy environment whereby the robotic lawnmower may be configured to listen to the subframes to make fast control decisions, and listen to the full frames to confirm the control decisions made based on the subframes.

The inventors have also realized that by changing the order of the frames to be transmitted a more robust reception is provided. The table below shows a schematic view of a frame and how the frame is rearranged in order to provide the more robust reception. As can be seen, the frames are not transmitted in order. A Frame F comprising 5 subframes F1 . . . F5 will then be transmitted in the order F1F4F2F5F3, whereby the subframes and their corresponding bits (assuming 2000 bits) are given by:

| Subframe | Bits |
| --- | --- |
| 1 | 1-400 |
| 2 | 801-1200 |
| 3 | 1601-2000 |
| 4 | 401-800 |
| 5 | 1201-1600 |

In one embodiment, this is utilized for the boundary signal A. The other signals, (guide and so on) are generally too short to utilize from the benefits associated herewith, but may of course also be transmitted in a similar manner.

Figure 4:
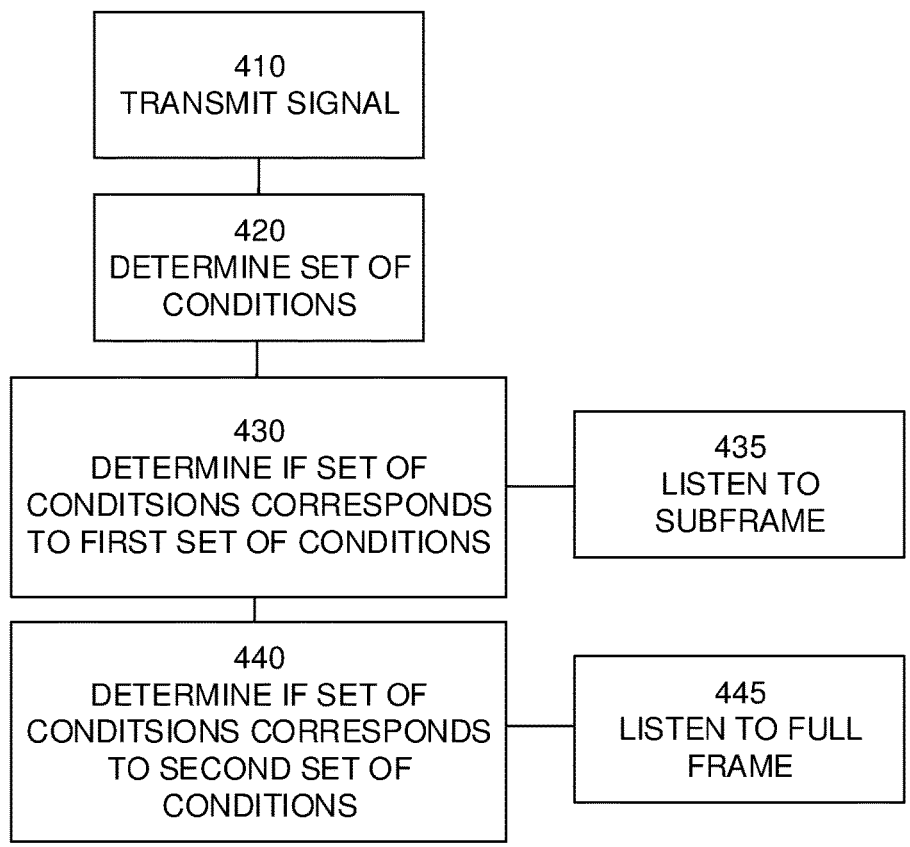
FIG. 4 shows a schematic flowchart for a general method according to the teachings herein.

FIG. 4 shows a schematic flowchart for a general method according to the teachings herein. A signal generator transmits 410 a boundary signal utilizing CDMA coding having a frame length through a boundary cable. The signal generator transmits said boundary signal in subframes. A robotic lawnmower is configured to receive the boundary signal by detecting magnetic fields generated by the boundary signal. The robotic lawnmower determines a set of conditions 420; and then determines 430 if said set of conditions correspond to a first set of conditions, and if so listen to the subframes 435, and determining 440 if said set of conditions correspond to a second set of conditions, and if so listen to the full frames 445.

It has been realized by the inventors that to simplify the installation process for a robotic lawnmower system, the user or installer may be given an option to install guide wires or not. Using guide wires has the benefit that the robotic lawnmower may be able to find its way back to the charging station more effectively than randomly searching for the charging station or F-field. Due to constrictions on allowed field strengths, the total field strength of the guide signal, including the F-field, must be kept below certain levels. This is a legal requirement to prevent a system from causing too much interference to its surroundings.

However, the inventors have realized the simple solution that by allotting the time slots for the guide cable(s) G to the F-field F, the field strength of the F-field may be increased without increasing the field strength for the whole guide signal, thereby allowing for a stronger F-field while staying within the legal requirements.

A controller of the charging station, the controller possibly being that of the signal generator 240, may thus be configured to determine whether a guide cable is connected or not and if it is detected that the guide cable is not connected, allot or assign the corresponding or associated time slot to the F-field. Alternatively, the associated time slot may be assigned to another guide cable, thereby allowing the robotic lawnmower to find that guide cable more quickly.

Alternatively, a timeslot associated with a guide cable that has not been connected, may be (time) shared by the connected guide cables and the F-field.

In one embodiment the controller may be configured to detect that a first guide cable and a second guide cable are not connected and allot the time slot associated with the first guide cable to the F-field, and allot the time slot associated with the second guide cable to a third guide cable.

The controller of the charging station is thus also configured to communicate through the information field to the robotic lawnmower so that the controller of the robotic lawnmower may adapt its sensing of the (boundary) signal(s).

In one embodiment a user may provide user input to indicate which guide cables are connected or not and the controller may then determine the time slot to use for F-field transmission accordingly.

Figure 5A:
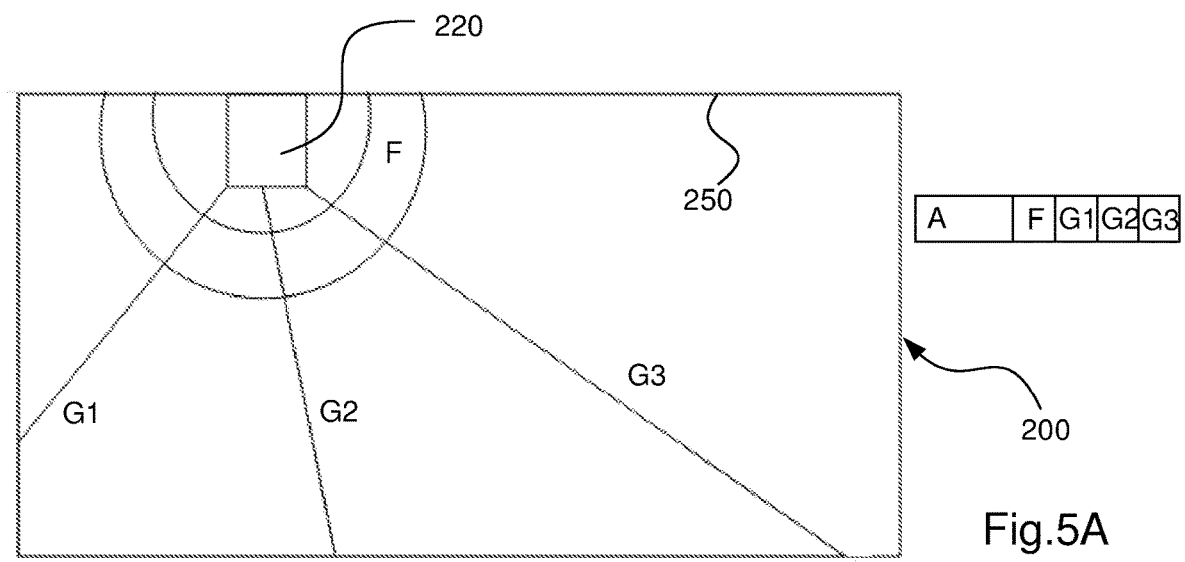
FIGS. 5A, 5B and 5C are schematic views of a robotic lawnmower system according to the teachings herein.
Figure 5B:
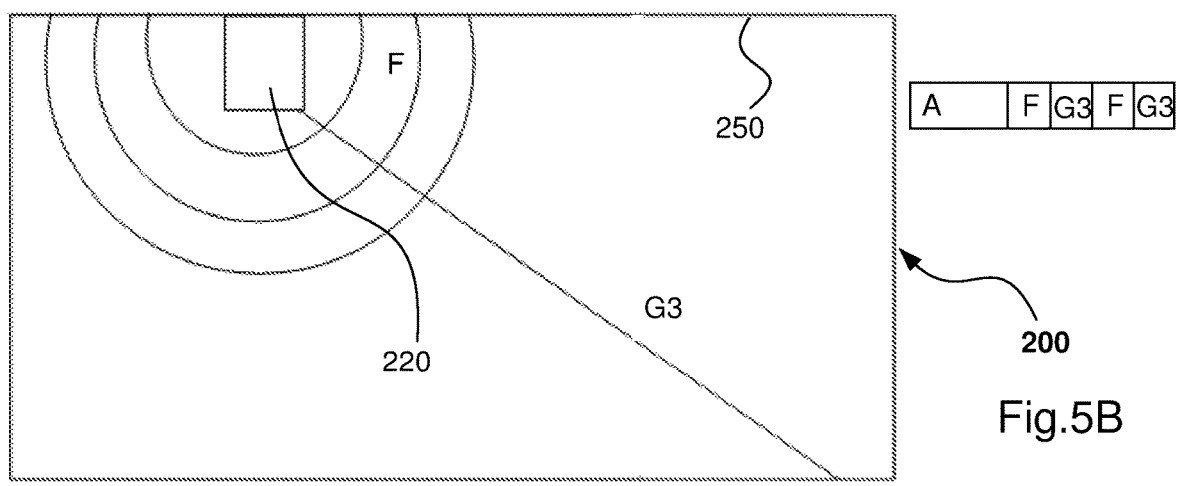
Figure 5C:
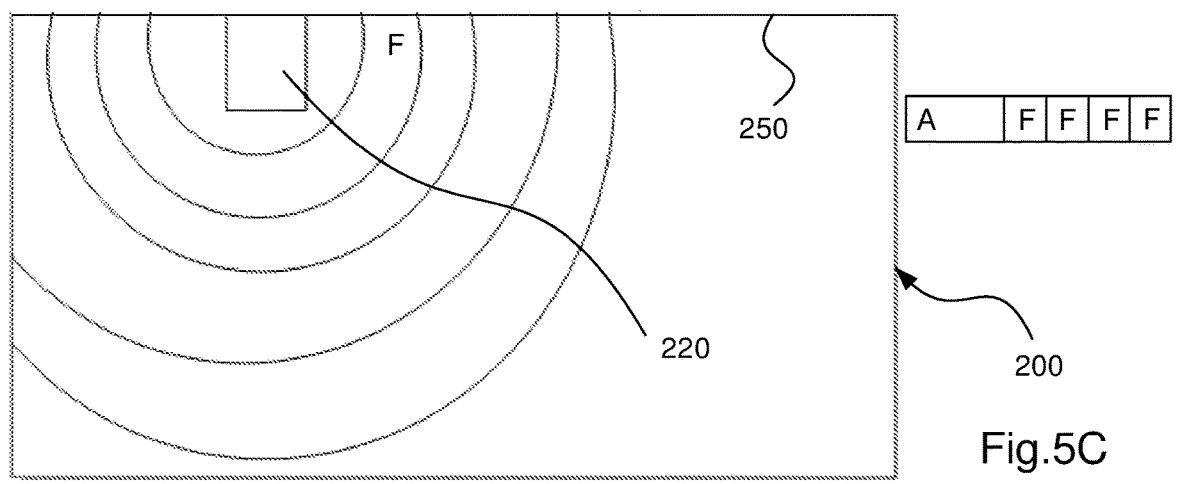

FIGS. 5A, 5B and 5C are schematic views of a robotic lawnmower system where an F-field F and three guide cables G1, G2 and G3 are normally used, as in FIG. 5A. A schematic view of the boundary signal 245 is also shown for each robotic lawnmower system, where in FIG. 5A, the boundary signal has timeslots for the actual boundary signal A and time slots associated with the F-field F, a first time slot associated with a first guide cable G1, a second timeslot associated with a second guide cable G2 and a third time slot associated with a third guide cable G3.

In the example of FIG. 5A, all three guide cables are used and the associated time slots are allotted accordingly.

In the example of FIG. 5B, only one guide cable G3 is used. As the controller of the charging station detects this, the controller allots the time slots associated with the unconnected guide cables G1, G2 are allotted to the F-field, and in this instance also to the third guide cable. As a skilled reader would realize, other allotments would also be possible within the teachings of this document. Both the F-field and the third guide cable are thus provided with a higher signal level and may thus be found more easily by the robotic lawnmower and thereby simplify the installation of the robotic lawnmower system, while enabling the robotic lawnmower to find the charging station easily without randomly searching for it through most of the working area, all while staying within the legal requirements.

In the example of FIG. 5C, no guide cable is used. As the controller of the charging station detects this, the controller allots the time slots associated with the unconnected guide cables G1, G2, G3 are allotted to the F-field, which then receives four time slots, thereby significantly increasing its field strength enabling the robotic lawnmower to more easily find the F-field thereby simplifying the installation of the robotic lawnmower system, while enabling the robotic lawnmower to still find the charging station easily without randomly searching for it through most of the working area, all while staying within the legal requirements. In one embodiment the time slots for F-signals replacing guide wire signals are time synchronized to match a corresponding sequential time slot number. Such an embodiment could be useful for handling complex signals, i.e. signals mainly comprising coded signals, such as CDMA signals or similar.

Figure 6A:
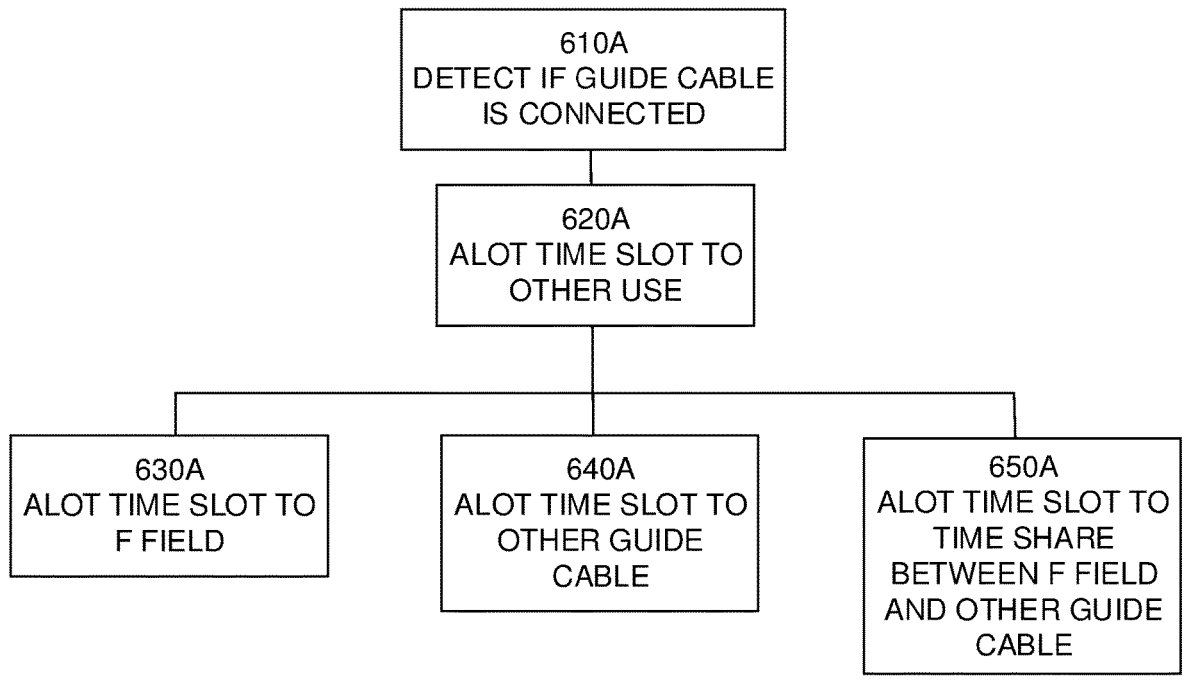
FIG. 6 shows a schematic flowchart for a general method according to the teachings herein.

FIG. 6A shows a flowchart for a general method according to herein where a controller of a charging station detects 610 whether a guide cable is connected or not, and if the guide cable is not connected, the controller allots an associated time slot to another use 620.

In one embodiment, the other use is to allot the associated time slot to the F-field F 630.

In one embodiment, the other use is to allot the associated time slot to another guide cable 640.

In one embodiment, the other use is to allot the associated time slot to be time shared between the F-field F and at least one other guide cable 650.

As a robotic lawnmower 100 picks up a signal, through the sensors 170, the picked up signal is analyzed by the controller 110. It could be noted that the picked up signal differs somewhat to the transmitted signal as if the sensors are based on coils detecting magnetic field changes, the sensors will only be able to detect changes in the signal(s), that is, only the derivate of the signal(s) is picked up. This would be understood by a skilled person and in the remainder of this description no explicit difference will be made between the transmitted signal and the picked up signal unless specifically specified.

As the controller receives a (picked up) signal, the signal is analyzed, which analysis comprises correlating the (picked up) signal to a stored (or calculated) library or referenced signal to determine if the (picked up) signal originates from the signal generator 220 of the robotic lawnmower system 200—or from another source. The time slots in the analyzed signal serve to identify if the (picked up) signal is transmitted through the boundary cable or a guide cable.

In one embodiment, the controller of the robotic lawnmower, and the controller of the charging station may be arranged to perform a startup routine, where the time slot originally associated with a guide cable that is not used is transmitted without the guide signal. The robotic lawnmower will then be given a time period, possibly 1, 5, 10 or 20 seconds, to sense that the associated guide cable is not used and adapts its sensing accordingly. After the startup routine, the controller of the charging station may commence transmitting another signal in the associated time slot. Such an embodiment could be useful for handling pulse signals, i.e. signals mainly comprising current pulses.

Figure 6B:
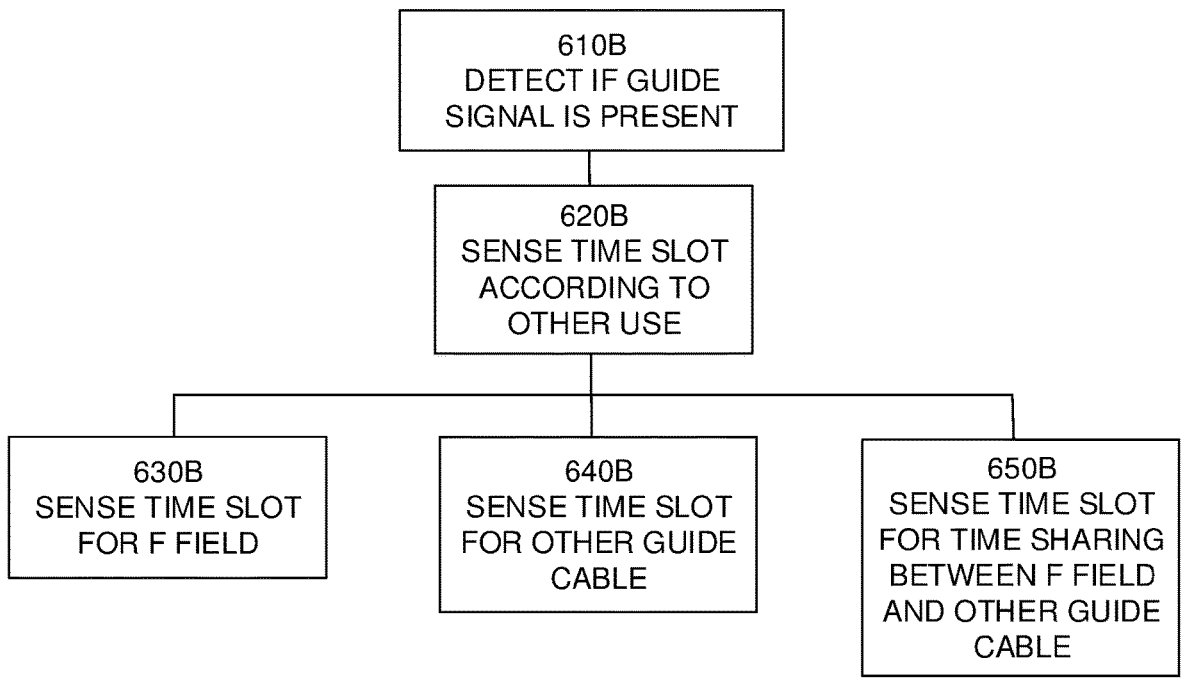

FIG. 6B shows a flowchart for a general method according to herein where a controller of a robotic lawnmower detects 610 whether a guide signal is present or not in a time slot, and if the guide signal is not present, the controller adapts its sensing to sense for a signal indicating another use 620.

In one embodiment, the other use is to allot the associated time slot to the F-field F 630.

In one embodiment, the other use is to allot the associated time slot to another guide cable 640.

In one embodiment, the other use is to allot the associated time slot to be time shared between the F-field F and at least one other guide cable 650.

In one embodiment, to establish a synchronization between the signal generator 220 and the controller 110 of the robotic lawnmower 100, the controller is configured to convolute the (picked up) signal and correlated to the library signal for the same time, that is $S(0)=L(0)$, where S is the picked up signal and L is the library signal. The (picked up) signal may also be correlated to previous or subsequent times $t=+/-1, +/-2$, etc. i.e. the signal is shifted in time.

As has been discussed above, the robotic lawnmower 100 may comprise at least one front sensor 170' and at least one rear sensor 170". During operation, the robotic lawnmower 100 will distance itself from the boundary cable 250 i.e. to operate within the inner portions of the work area 254. At such distances, the received signal may be received at a lower amplitude or signal strength. The reception will then be more susceptible to noise and interference. One of the major interference sources are actually the electric motors and the control signals for these. Traditionally, the robotic lawnmower is then configured to synchronize to the received signal using the front sensor(s) 170' as they are spaced further apart from the electric motors.

However, during operation, the robotic lawnmower may also operate in close vicinity of the border cable 250. At such close distances, the predominant interference is from neighbouring systems. Traditionally, the robotic lawnmower is then configured to synchronize on the rear sensor(s) 170" as they would be further away from the neighbouring systems.

The traditional method thus detected an amplitude of the received signal, and adapted which sensor(s) to synchronize on accordingly. However, the inventors have realized that this manner of selecting which sensor to synchronize on does not provide the optimum synchronization when the work area comprises overlapping or stacked (adjacent) work areas. The inventors have also realized that this synchronization scheme did not perform optimally when following a boundary cable.

The inventors have therefore devised an improved manner of selecting which sensor(s) to synchronize on. In this improved manner, the controller 110 of the robotic lawnmower 100 is configured to compare the signal (possibly obtained through autocorrelation) of one sensor 170 to a received reference sensor level. The received reference sensor level may be the total signal level, or the received reference sensor level may also or alternatively be the average signal level of all sensors 170.

A signal qualifier may thus be used to determine which sensor to use.

The signal qualifier may be related to a quality of the received signal and/or a correlation value of the received signal when correlated to a reference signal.

The sensor which has the highest signal qualifier, will be the sensor used for synchronization. This ensures that the best synchronisation is achieved irrespective of the current situation or location.

It also enables the robotic lawnmower to synchronize to which ever cable or field that happens to provide the best signal level, be it the guide cable, the boundary cable, the F-field or the N-field.

This provides for a more robust synchronization that can adapt to changing environments. It also provides a synchronisation that is more beneficial for use with overlapping or adjacent work areas.

The controller is thus configured to receive a signal through a first sensor 170' and to determine a first signal level for the first sensor 170'.

In one embodiment the signal qualifier is determined based on the average of received signal qualifiers from signals received through all sensors 170.

In one embodiment the signal qualifier is determined based on the total of received signal qualifiers from signals received through all sensors 170.

The controller is also configured to receive a signal through a second sensor 170" and to determine a second signal qualifier for the second sensor 170".

The sensor 170 providing the highest signal qualifier is then selected for synchronisation.

Figure 7:
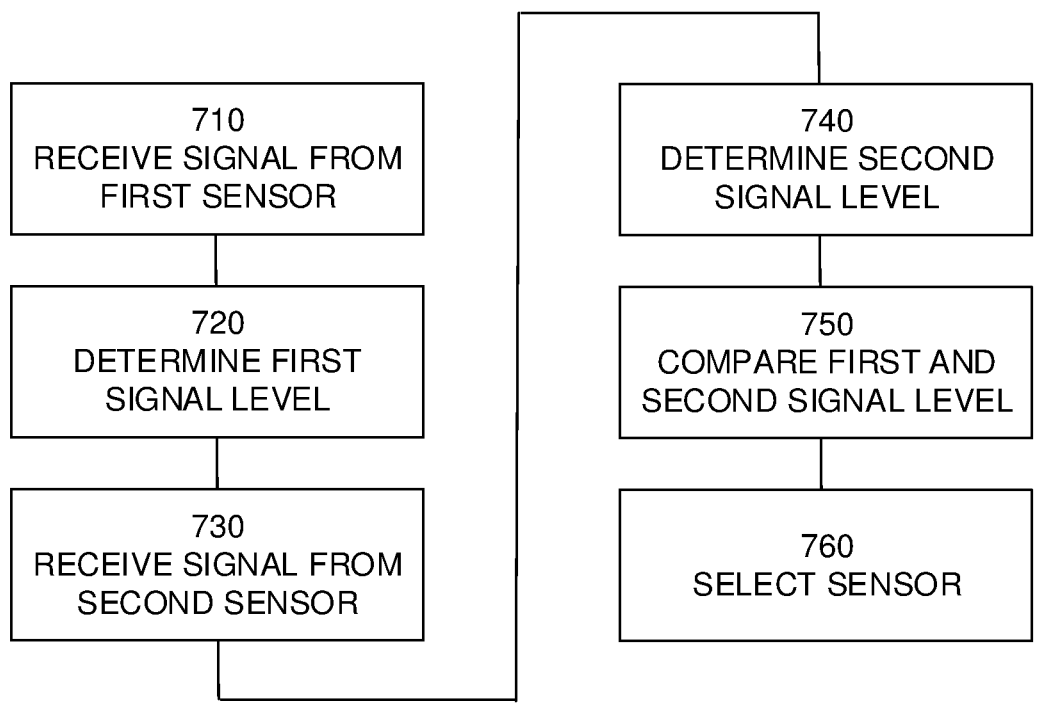
FIG. 7 shows a schematic flowchart for a general method according to the teachings herein.

In one embodiment the signal level is determined through auto correlating with a library signal. In one such embodiment, the quality of the received signal is determined using the formula below:

$$\text{signal quality level} = \frac{\sum_{1}^{N} c_i * x_i}{N \sqrt{\frac{\sum_{1}^{N} x_i^2}{N}}}$$

where
N=Frame length (for example 2047)
$c_i$=value at time i of the library signal
$x_i$=value at time i of the received or picked up signal The flowchart of FIG. 7 shows a method according to the teachings herein, where an robotic lawnmower receives 710 a signal through a first sensor 170' and determines 720 a first signal qualifier for the first sensor 170'.

In one embodiment the signal quality level is determined based on the average of received signal quality levels from signals received through all sensors 170.

In one embodiment the signal quality level is determined based on the total of received signal quality levels from signals received through all sensors 170.

The robotic lawnmower also receives 730 a signal through a second sensor 170" and determines 740 a second signal quality level (or quality) for the second sensor 170".

The robotic lawnmower then compares the first and second signal quality levels 750 and the sensor 170 providing the highest signal quality level is then selected for synchronisation 760.

As has been discussed in the background section, the work area and the boundary cable of a robotic lawnmower system may be modelled as an RL-circuit, where the R and L components (resistance R and inductance L) depend on the physical characteristics of the work area, including the characteristics of the ground and the size of the area. As such, and as the inventors have realized, this makes it difficult when transmitting CDMA signals, as the decoding on the receiver side need to be highly advanced for correct decoding of the received signals, as the received signal will differ depending on which work area it is used in. As the inventors have realized, an RL-circuit will act as a low-pass band filter when transmitting signals with varying or several frequency components. This will, as is also mentioned in the background section, attenuate the higher frequency components, which may lead to that signals having many frequency components, such as CDMA signals, may be incorrectly received or decoded.

Assuming that all frequencies are transmitted at the same amplitude, the RL-circuit (composed by the work area) will filter the frequencies differently, and the received signal will be difficult to decode correctly. The amount of filtration will depend on the RL-components modelling the actual work area.

Figure 8:
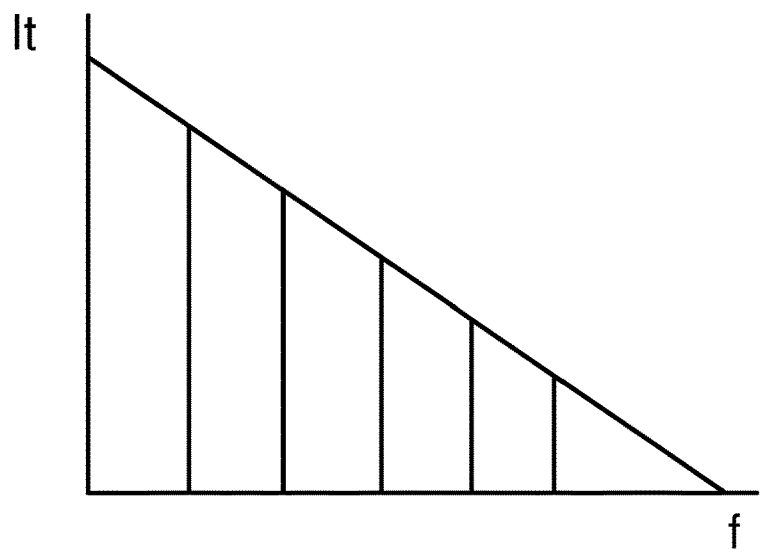
FIG. 8 shows a amplitude frequency diagram for a transmitted signal according to one embodiment of the teachings herein.

Instead of simply and straightforwardly increasing the voltage level for the higher frequency components, which would also enable the CDMA signals to be correctly received, the inventors have proposed a more clever and ingenious manner of providing the boundary signals. The inventors firstly propose to use a current generator instead of a voltage generator traditionally used. Secondly, the inventors propose to prefilter the transmitted signal corresponding to a model of the work area. The prefiltering basically means that the higher frequencies should be transmitted at lower amplitudes, as in FIG. 8 showing a frequency-amplitude diagram for a transmitted signal It.

This enables the CDMA signal to be correctly received by the receiver without increasing the overall field strength too much.

Figure 9:
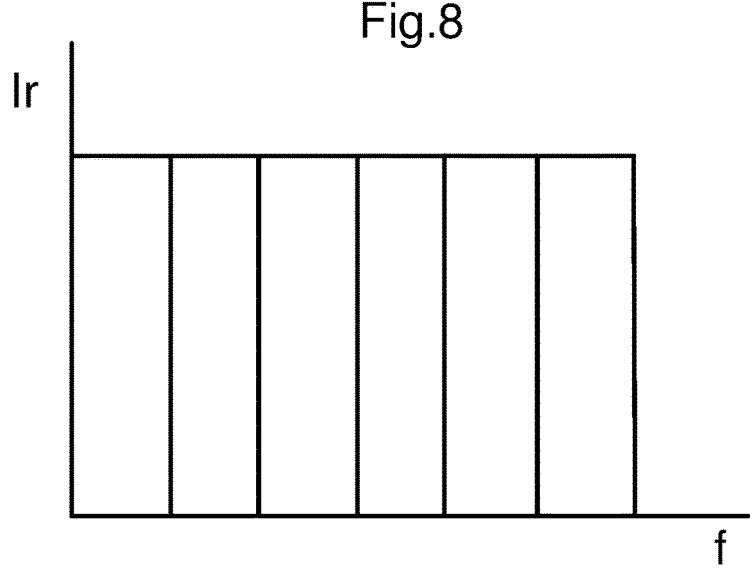
FIG. 9 shows a amplitude frequency diagram for a received signal according to one embodiment of the teachings herein.

As the inventors have realized, this is made possible by the fact that the receiver side reacts to the derivate of the signal (i.e. to the changes in the signal). As the higher frequency components change more rapidly, the sensors will also pick them up more easily. The received signal will thus look as in the schematic view of FIG. 9.

Thus by modelling the work area on an RL-circuit and adapting a current generator to transmit a signal accordingly, an improved reception of the CDMA signal is provided. And, this is achieved without increasing the power at which the high frequency components/signals are transmitted.

By transmitting the signal in the manner shown in FIG. 8, the reception becomes substantially indifferent to the RL-modelling of the work area.

In one embodiment, the controller of the robotic lawnmower may be configured to determine a signal level for a low frequency component and to determine a signal level for a high frequency component and based on this, the RL-model used by the current generator may be adapted accordingly, whereby the output for the current generator is adapted to fit the RL model as based on the measurements made by the robotic lawnmower. Even though only two signal levels are mentioned herein, the skilled person would realize that to provide an accurate model, several signal levels could be needed.

The measurements made by the robotic lawnmower may be communicated wirelessly through an RF interface (if such is comprised in the robotic lawnmower), or through the charging plates upon docking in the charging station.

The signal to be transmitted through the boundary cable may thus be pre-filtered according to the actual RL-model of the work area, before being transmitted by the current generator.

Although the description herein have been focussed on an RL-model for the prefiltering representing the work area, it should be understood that the RL-model may also comprise other components, such as capacitance.

In one example the resistance, that is the R component, of the filter is 20 Ohm, and the inductance, that is the L component, of the filter is 20 mH.

Figure 10:
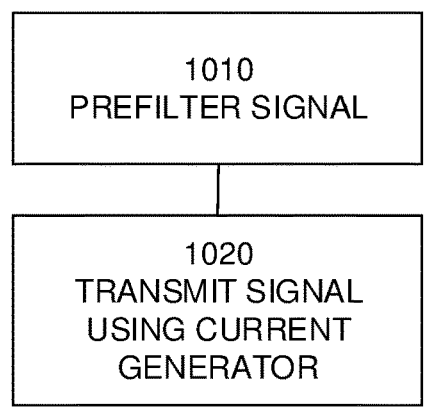
FIG. 10 shows a schematic flowchart for a general method according to the teachings herein.

FIG. 10 shows a schematic flowchart for a general method according to the teachings herein, where a signal generator is configured to prefilter a signal to be transmitted through a model filter 1010, and then transmit the signal using a current generator 1020.

As the inventors have also realized, in order to improve the reception of higher frequency components, the current generator may be arranged to operate by transmitting the signal at a constant current level. This will enable the high frequency components to be received at a higher signal level, and therefore be less susceptible to noise and other interference, which is preferable when using CDMA signalling. This is also achieved by not transmitting at higher power levels compared to contemporary systems, thereby reducing or at least not increasing the interference of other, neighbouring systems and devices.

The realization of using a current generator to transmit a prefiltered signal provides for an improved manner of transmitting CDMA signals that reduces or at least not increases the interference of other, neighbouring systems and devices.

As the signal is transmitted through the boundary cable, there might be a leak of current through stray capacitances that occur between the boundary cable and the surrounding environment. This can lead to that currents are flowing through the boundary cable affecting the quality of the signal being transmitted there through. The leaking current may also create a negative magnetic field that may fool the robotic lawnmower to believe it is operating outside the boundary cable 250, when in fact it is still inside the work area 205. This may result in that the operation of the robotic lawnmower is hindered or cancelled. The inventors have realized this problem and have, after insightful reasoning, come up with a simple solution that does not require any change or addition to the boundary cable, which would increase the cost of the robotic lawnmower system and also complicate the installation of the robotic lawnmower system. The inventors are proposing to adapt the synchronization done by the robotic lawnmower so that as it detects that it is sufficiently close to a guide cable G/260, sufficiently meaning being able to receive a signal with good signal quality (or at least better than the quality at which the control signal being transmitted through the boundary cable is received) and far from the boundary cable (i.e. at a distance where the signal amplitude level is below a threshold value or lower than that of the guide cable and/or where the signal quality level is below a threshold value or lower than that of the guide cable), the robotic lawnmower is configured to start synchronizing on the guide signal instead of the boundary signal. This enables the robotic lawnmower to safeguard against being fooled by the stray capacitances and leaking currents to believe it is outside the area when in fact it is not.

In one embodiment, the robotic lawnmower is configured to only listen to the low frequencies of the control signal transmitted through the boundary cable. As mostly the higher frequencies are affected by these leaking currents, only listening to the lower frequencies reduces the risk of being fooled. The robotic lawnmower will thus still be able to determine that the boundary cable is still present, even when synchronizing on the guide signal. To listen to both the guide signal and to the lower frequencies of the boundary signal also allows for determining the correct position of the robotic lawnmower, even in situations such as when the guide cable is actually outside the work area. It also allows the robotic lawnmower to determine that the robotic lawnmower is closer to the boundary cable, where the effects of the stray capacitances are smaller and then switch over or back to synchronize on the boundary signal again. Examples of such low frequency ranges are 0.5 kHz to 2 kHz in a signal having a frequency range of for example 0.5 kHz to 7 kHz, Other examples is that the low frequencies correspond to the lower 15% of the frequencies in the signal, the lower 20% of the frequencies in the signal, the lower 25% of the frequencies in the signal, the lower 30% of the frequencies in the signal, the lower 35% of the frequencies in the signal or the lower 50% of the frequencies in the signal.

Figure 11:
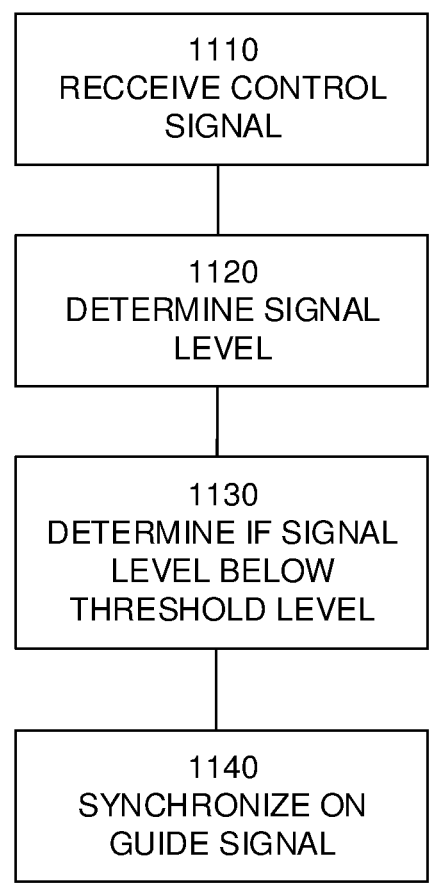
FIG. 11 shows a schematic flowchart for a general method according to the teachings herein.

FIG. 11 shows a flowchart for a general method according to the teachings herein where a robotic lawnmower is configured for receiving 1110 the control signal and determining 1120 a signal level for the control signal; and if the signal level for the control signal is below 1130 a threshold value, the robotic lawnmower receives said guide signal and synchronizes 1140 on said guide signal.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic lawnmower system, comprising:
a charging station comprising a controller configured to transmit a control signal having a plurality of time slots; and
a robotic lawnmower configured to receive the control signal;
wherein said controller is configured to:
detect if a guide cable is connected to the charging station or not connected to the charging station,
allot a time slot of the control signal for use to transmit a guide signal associated with the guide cable if the guide cable is connected to the charging station; and
allot the time slot of the control signal to a use other than for use to transmit the guide signal for the guide cable if the guide cable is not connected to the charging station.

2. The robotic lawnmower system according to claim 1, wherein, if the guide cable is not connected to the charge station, the controller is configured to allot the time slot to generation of an F-field, the F-field being a magnetic field generated around the charging station to enable the robotic lawn to navigate towards the charging station by detecting an increasing field strength of the F-field.

3. The robotic lawnmower system according to claim 1, wherein the controller is configured to allot the time slot to another guide cable.

4. The robotic lawnmower system according to claim 1, wherein the controller is configured to allot the time slot to be time shared between an F-field and/or another guide cable(s).

5. The robotic lawnmower system according to claim 1, wherein the controller is configured to receive user input indicating if the guide cable is to be determined as connected or not.

6. The robotic lawnmower system according to claim 1, wherein the controller is configured to determine a number of detected guide wires connected to the charging station and to transmit at least one F-signal for each guide wire not connected.

7. The robotic lawnmower system according to claim 1, wherein the controller is configured to time synchronize time slots for F-signals replacing guide wire signals to match a corresponding sequential time slot number.

8. A method for use in a robotic lawnmower system comprising a charging station comprising a controller configured to transmit a control signal having a plurality of time slots, and a robotic lawnmower, wherein said method comprises:
detecting if a guide cable is connected to the charging station or not connected to the charging station;
allotting a time slot of the control signal for use to transmit a guide signal associated with the guide cable if the guide cable is connected to the charging station; and
allotting the time slot of the control signal to a use other than for use to transmit the guide signal for the guide cable if the guide cable is not connected to the charging station.

9. A robotic lawnmower comprising:
a controller; and
at least one magnetic sensor;
wherein said controller is configured to:
receive a control signal from a charging station, the control signal having a plurality of time slots;
detect that a guide signal associated with a guide cable connected to the charging station is present in a time slot of the control signal and, in response, operate the robotic lawnmower based on the guide signal and the guide cable; and
detect that the guide signal is not present in the time slot of the control signal and, in response, adapt a sensing of the control signal to sense a signal other than the guide signal for the guide cable in the time slot.

10. The robotic lawnmower system of claim 1, wherein the controller is configured to associate the time slot for use to transmit the guide single within a code division multiple access (CDMA) scheme.

11. The robotic lawnmower system according to claim 1, wherein, if the guide cable is not connected to the charge station via a first connector, the controller is configured to:
allot the time slot to generation of an F-field or another guide cable that is connected to the charging station via a second connector, the F-field being a magnetic field generated around the charging station to enable the robotic lawnmower to navigate towards the charging station by detecting an increasing field strength of the F-field.

12. The robotic lawnmower system according to claim 1, wherein the controller is configured to:
allot the time slot of the control signal for use to transmit the guide signal associated with the guide cable if the guide cable is connected to the charge station via a first connector; and
allot another time slot of the control signal for use to transmit the guide signal associated with the guide cable if another guide cable is not connected to the charge station via a second connector.

* * * * *